Patented Mar. 12, 1929.

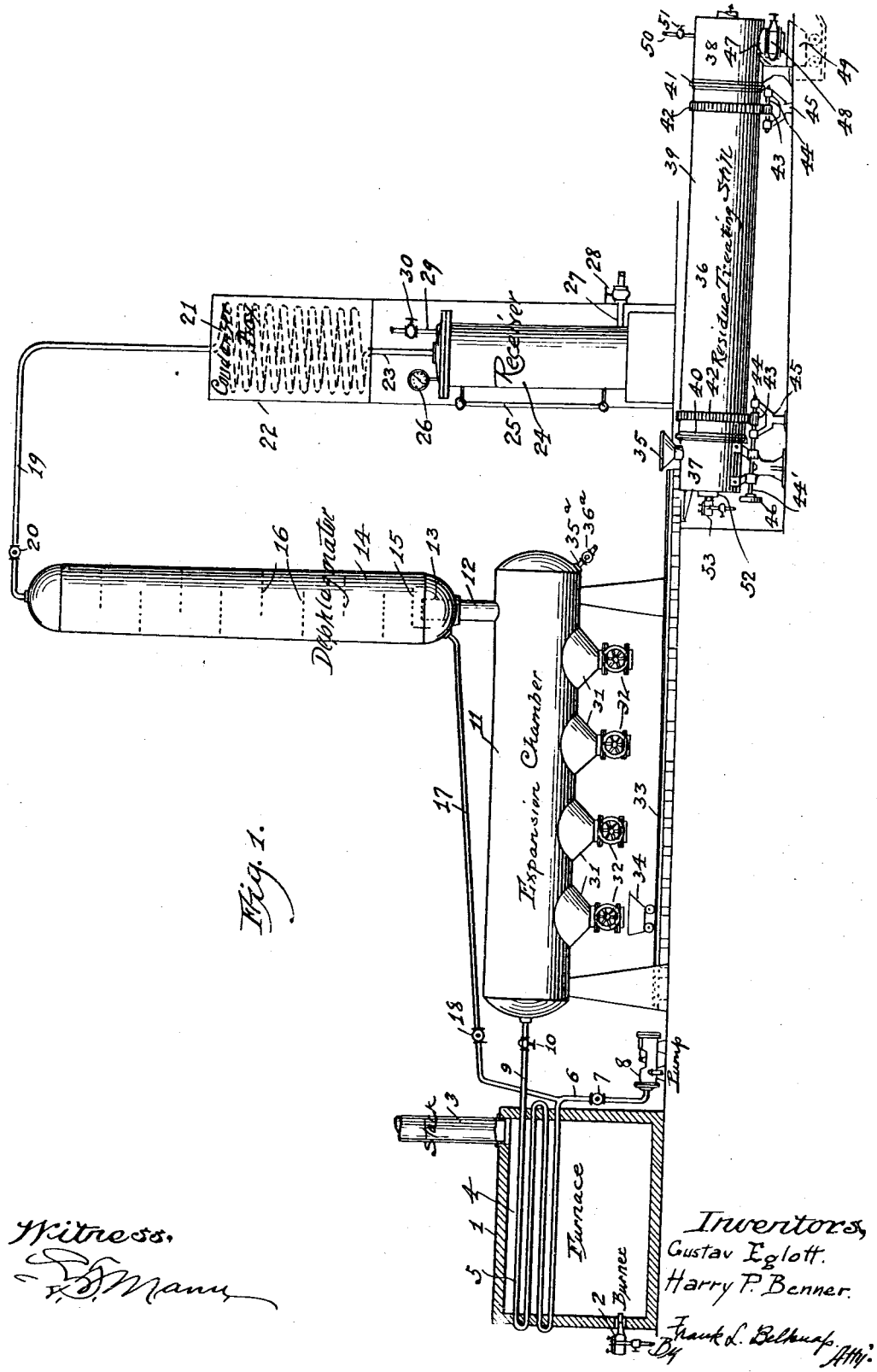

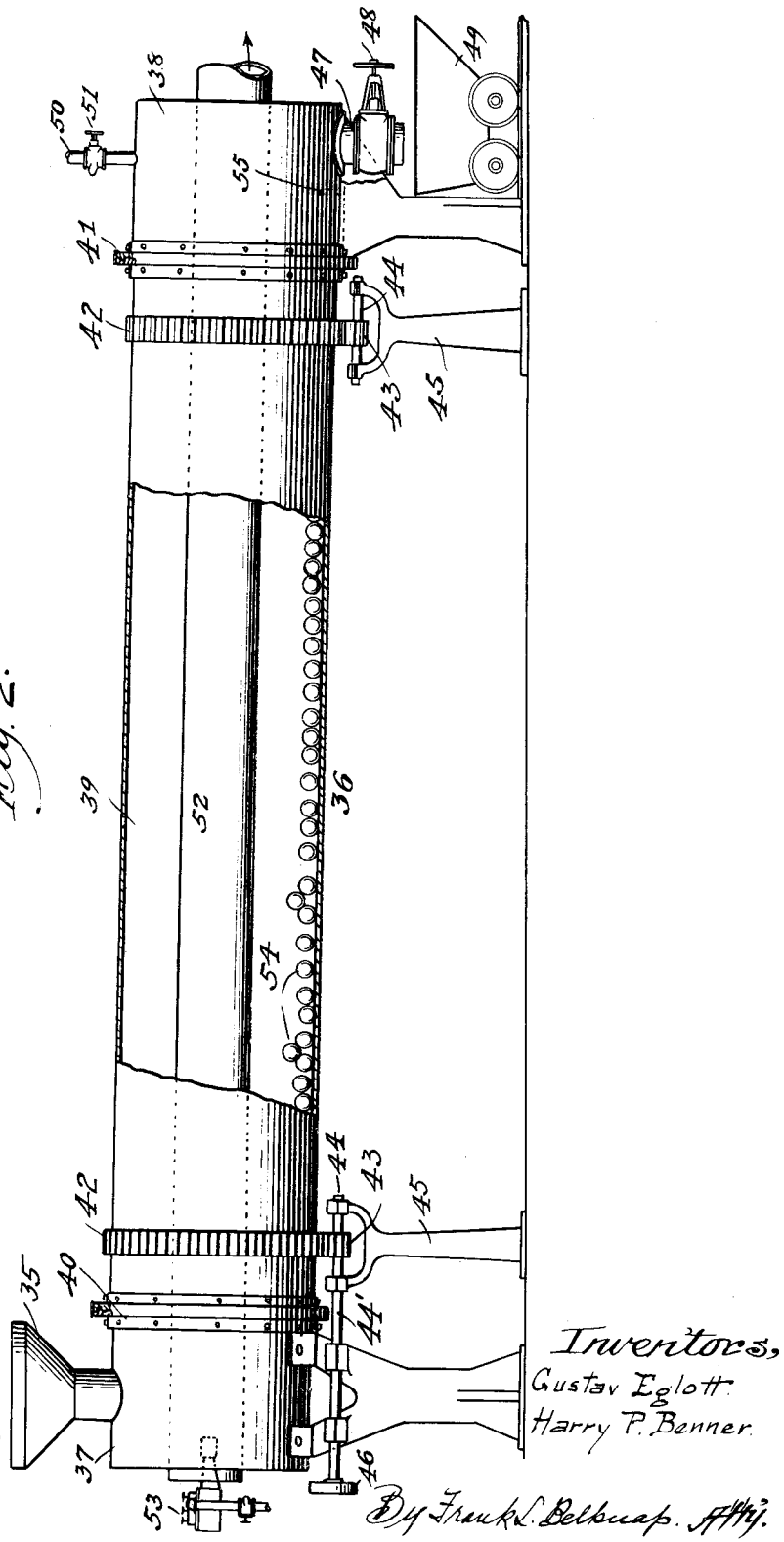

1,705,179

UNITED STATES PATENT OFFICE.

GUSTAV EGLOFF AND HARRY P. BENNER, OF INDEPENDENCE, KANSAS, ASSIGNORS TO UNIVERSAL OIL PRODUCTS COMPANY, OF CHICAGO, ILLINOIS, A CORPORATION OF SOUTH DAKOTA.

PROCESS FOR TREATING CARBON FROM CRACKING STILLS.

Application filed April 23, 1921, Serial No. 463,938. Renewed February 20, 1928.

This invention relates to improvements in process and apparatus for cracking oil, and refers more particularly to the cracking of petroleum oil, to convert substantial percentages thereof to light hydro-carbons, such as gasolene or gasolene-like bodies. The particularly novel feature of this invention consists in the manner of handling the residual products produced from the cracking reaction, so that the heavy liquid constituents thereof are removed from the carbon constituents of the residual products.

The invention will more clearly appear from the accompanying drawings and description thereof, in which Fig. 1 is a view partly in side elevation and partly in vertical section of our improved apparatus; and Fig. 2 is an enlarged view partly in vertical section and partly in side elevation of that portion of the apparatus in which the residue from the cracking still is treated.

Referring to the drawings, 1 designates the furnace, provided with burner 2, stack 3, combustion space 4. In the combustion space the furnace is mounted with the heating element or cracking coil 5, which may take the form of a continuous length of six-inch pipe. The inlet side of the coil is connected by feed line 6 and throttle valve 7 to the charging pump 8. The discharge side of the coil is connected with transfer line 9, throttle valve 10, to one end of an elongated expansion chamber 11, located outside of the fire zone, and, in the present instance, taking the form of a large horizontally disposed cylindrical shell. The vapor space of the expansion chamber 11 is provided with vapor outlet pipe 12, extended as shown at 13, into the lower end of a vertical dephlegmator or a reflux condenser 14. The extension 13 is provided with a spaced cap member 15, the arrangement being such as to permit the vapors to enter the dephlegmator while preventing the reflux condensate from falling back into the still. The dephlegmator is provided with alternately disposed baffle members 16 and reflux return pipe 17, having throttle valve 18, leading back to the feed line 6. The upper end of the dephlegmator is connected by pipe 19, having throttle valve 20, to condenser coil 21, seated in water condenser box 22. The lower end of the coil is connected by pipe 23 to the top of receiver 24. This receiver 24 is provided with liquid level gauge 25, pressure gauge 26, draw off pipe 27, controlled by throttle valve 28, gas outlet pipe 29, controlled by throttle valve 30. The arrangement is such that a uniform pressure may be maintained in the entire system, or a differential pressure may be maintained on various parts of the system, by regulating the valves shown.

Referring now to the manner of handling the carbon precipitated in the expansion chamber at the time the oil is vaporized, the lower end of the chamber 11 is provided with residue draw off pots or conduits 31, controlled by throttle valves 32. Mounted directly beneath the draw off conduits 31 is a track 33, on which rides a car 34 for receiving the carbon containing residue from the expansion chamber. The carbon is drawn off from the conduits 31 into the car 34 after the run is completed. The liquid residue may be intermittently or continuously drawn off through residue pipe 35$^a$, controlled by throttle valve 36$^a$. At the end of the run, the expansion chamber may be one-half to two-thirds full of oil soaked carbon which is drawn off through the conduits 31 into the car 34, and thence delivered to the hopper 35 of a residue treating still 36.

This still 36 comprises a pair of cylindrical stationary members 37 and 38 connected by means of the rotating shell 39 through the rotating joints 40 and 41. The member 39 is rotated through the circumferentially extending gears 42 and intermeshing spur gears 43, mounted on shafts 44, carried by suitable supports 45. One of the shafts 44 is provided with an extension 44', which is connected to a driving pulley 46, leading to any suitable source of power, whereby the shell member 39 may be slowly rotated. The stationary end 38 is provided with a carbon draw off pipe 47, controlled by valve 48, and adapted to deliver the carbon to suitable car 49. The distillates are removed from the residue treating still through the vapor pipe 50, controlled by throttle valve 51, and leading to any suitable condenser and receiver (not shown).

The still is internally heated by means of the pipe 52, provided at one end with a burner 53, and the other end connecting to suitable stack (not shown). In order to more effectively, mechanically break up the carbon into a fine state of division, we preferably provide the rotating member 39 with a plurality or series of steel balls or the like 54, which balls may be prevented from passing out through the pipe 47 through suitable stop 55 in the stationary member 38.

In carrying out the process the oil is continuously fed to the heating coil 5 and delivered in substantially liquid phase to the expansion chamber, where vaporization takes place, and the carbon is precipitated. The generated vapors are passed to the dephlegmator, the heavier portions condensed and returned as reflux condensate to the heating coil for further treatment, while the uncondensed portions pass out to the final condenser and receiver. As the run proceeds, oil soaked carbon will accumulate in the expansion chamber until the expansion chamber may be from a half to two-thirds full, at which time it will probably be desirable to shut the plant down in order to clean out the expansion chamber. At this time, the oil soaked carbon is drawn off through the conduits 31, delivered to the car 34, to the hopper 35, and thence to the still 36. There the carbon is heated and distilled at atmospheric pressure, the carbon being heated to a sufficient temperature to drive off the liquid portions of the residue. The liquid distillate obtained from distilling this oil soaked carbon may be used as fuel, or re-cracked, or otherwise disposed of. The dry carbon can be used for such purposes as carbon electrodes, or may be activated or may be used for filler in automobile tires and may be used for inks and other uses.

It is to be understood that during the cracking operation, the cracking apparatus may be maintained under any desired vapor pressure either from the still to the receiver, or a differential pressure may be maintained in various parts of the system.

We claim as our invention:

1. A process for treating oil soaked carbon produced in an oil cracking operation comprising charging a still with a quantity of such oil soaked carbon, subjecting said carbon to a heat treatment sufficient to distill off all the liquid constituents thereof by applying the heat centrally of said still to cause the heat to radiate through said oil soaked carbon, and continuously agitating such carbon adjacent the walls of said still while undergoing said heat treatment.

2. A process of treating oil soaked precipitated carbon formed during an oil cracking operation consisting in charging a still with a quantity of such carbon, in subjecting the carbon to a heat treatment by applying heat centrally of the body of oil soaked carbon in said still to radiate through said carbon and in continuously agitating the carbon in the coolest zone of the still while under an atmospheric pressure, in taking off the liquid constituents of said carbon as vapor from said still, in condensing and collecting such vapors and in discharging the dry carbon from the still.

GUSTAV EGLOFF.
HARRY P. BENNER.